United States Patent [19]

Sappok et al.

[11] Patent Number: 4,824,610

[45] Date of Patent: Apr. 25, 1989

[54] COLORANTS FOR BALL-POINT PEN AND RIBBON INKS

[75] Inventors: Reinhard J. Sappok, Montclair, N.J.; Louis R. de Alvare, Holland, Mich.; Floyd G. Spence, Holland, Mich.

[73] Assignee: BASF Corporation, Parsippany, N.J.

[21] Appl. No.: 135,699

[22] Filed: Dec. 21, 1987

[51] Int. Cl.$^4$ ................................................ C09B 11/10
[52] U.S. Cl. ..................................................... 260/391
[58] Field of Search ......................................... 260/391

[56] References Cited

U.S. PATENT DOCUMENTS 3,679,713  7/1972  Feldman et al. ................... 260/391
4,330,476  5/1982  Hermann ............................ 260/393
4,448,446  5/1984  Flores ................................. 260/391
4,678,613  7/1987  Flores ................................. 260/391

*Primary Examiner*—Glennon H. Hollrah
*Assistant Examiner*—Raymond Covington
*Attorney, Agent, or Firm*—William G. Conger

[57] ABSTRACT

Substantially pure triarylmethane dyestuff salts free of contamination by arylamines are prepared by isolating in relatively pure form, the carbinol base corresponding to the dyestuff followed by salt formation by reaction with the appropriate acid. The resulting colorants are highly suitable for ball-point pen, printing, and ribbon inks.

10 Claims, No Drawings

COLORANTS FOR BALL-POINT PEN AND RIBBON INKS

BACKGROUND OF THE INVENTION

1. Field of the Invention

The subject invention relates to a process for manufacturing colorants. More particularly, it relates to a process for manufacturing non-volatile colorants and the resulting products which are suitable for use in ribbon, ball-point pen, and other inks. These colorants are manufactured from a by-product stream of alkali blue preparation.

2. Description of the Related Art

Although many of the triarylmethane dyestuffs have declined in importance in recent years, pararosaniline and its analogues have remained significant products, especially as intermediates in preparing colorants such as spirit blue and sulfonated derivatives, for example, soluble sky blue, and particularly alkali blue.

The precursors to these sulfonated products have been produced by a variety of methods, for example by the condensation of ring substituted or unsubstituted methylenedianilines (MDA) with aniline or substituted anilines such as the toluidines. These precursors thus have the general formula:

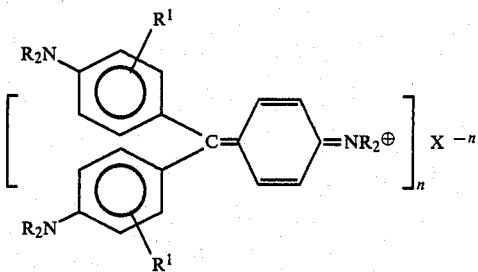

wherein $R^1$ may be, by way of example, hydrogen, $C_1$–$C_8$ alkyl or alkenyl, halo, cyano, or alkoxy; X is an anion of valence n, for example an ion such as chloride, sulfate, or nitrate; n is a whole number from 1 to about 3; and R is hydrogen, lower alkyl, lower alkenyl, phenyl, substituted phenyl, naphthyl, or substituted naphthyl.

The simplest member of this series is pararosaniline (paramagenta, parafuchsine, CI 42500) where R and $R^1$ are both hydrogen. Thus the structural formula is:

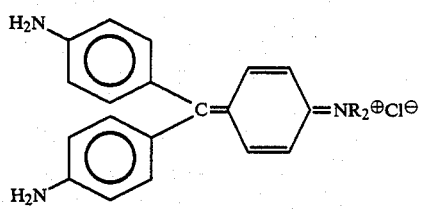

Of course, as is well known, the structural form given above represents only one cannonical version of the actual structure which is a resonance hybrid.

Pararosaniline has been prepared by heating 4,4'-MDA with aniline, aniline hydrochloride, nitrobenzene, and ferric chloride; by heating aniline and p-toluidine and their hydrochlorides with iron or ferric chloride and nitrobenzene; and by oxidizing a mixture of aniline with $AlCl_3$ and carbon tetrachloride. Modernly, however, the preferred method of manufacture is the air oxidation of 4,4'-MDA and aniline in excess aniline, using vanadium oxide or other suitable catalyst. Replacement of 4,4'-MDA in whole, or in part, with ring substituted MDA's such as 3,3'-dimethyl-4,4'-MDA or 2,2'-dimethyl-4,4'-MDA, or the replacement of aniline by substituted anilines such as the toluidines results in similar products having somewhat different color, shade, and tinctorial strength. Of course, N-methylated MDA's and aniline may also be utilized. The presence of the N-alkyl groups causes a greater bathochromic shift in the absorption spectrum due to the increased basicity of the dye base.

Pararosaniline and its analogues mentioned above are excellent candidates for ink colorants, particularly for ribbon inks. In these applications, the dyes are generally used in the form of salts, most often as salts of resinic acids such as oleic acid. Due to the methods of synthesis generally used, however, it has proven difficult to prepare such salts in relatively pure form.

Older syntheses of pararosanilines and similar compounds generally resulted in the formation of the practically colorless leuco base, which could easily be isolated as a filter cake and washed free of contaminants and unreacted anilines and toluidines. The leuco form could be converted to the carbinol form by oxidation with lead dioxide. Subsequent reaction in situ (the carbinol form is not reported to have been isolated) with acid yielded the dyestuff. The modern process, however, results in formation of the hydrochloride salt directly.

By conducting the reaction in the presence of excess aniline and eliminating the addition of acid during oxidation, the relatively unstable color base may be formed. Unfortunately, the color base cannot itself be reacted with resinic acids to form a commercial product because the resulting resinate contains large quantities of impurities, particularly aniline, which makes the product unsuitable for its use in ribbon inks and the like because their arylamine content would require the presence of poison labels. Such labels would make the product commercially unacceptable. The hydrochloride cannot be used to form the resinate, due to the fact that resinic acids, such as oleic acid, fail to react because the acid-base equilibrium lies far to the side of the original hydrochloride salt. Thus a method of preparation of pararosaniline family colorant resinates is desirable which would enable the economic removal of reaction by-products while allowing for a aniline-free product. Heretofore, such a process has not been available to the dye industry.

SUMMARY OF THE INVENTION

It has now been surprisingly discovered that the carbinol form of certain of the triarylmethane dyestuffs are stable species which may be isolated in relatively pure form. This form may then be used to prepare resinic acid salts of high purity. The resinate, which is generally a brownish orange, may be used as a colorant in ball-point pen, ribbon, and other inks.

DESCRIPTION OF THE PREFERRED EMBODIMENTS

The preferred colorants which may be successfully used in the pratice of the subject invention are pararosaniline and the various ring-methylated and N-methylated pararosaniline analogues. Preferably utilized are pararosaniline itself, and its methylated analogues containing one or two ring-connected methyl groups. In any event, the paraosaniline or pararosaniline analogue must posses a stable carbinol form which is capable of isolation. The actual method of isolation will vary from dyestuff to dyestuff.

The preferred method of isolation is a two-step process, the first step of which involves formation of the nitrate salt. In this process, the pararosaniline hydrochloride salt is treated with aqueous sodium nitrate. The resulting slurry of the nitrate salt is isolated as a filter cake, preferably by centrifugation. The isolation of the dyestuff as the nitrate salt has the advantage of allowing from the removal of considerable quantities of water-soluble impurities at this stage.

In the second step of the preferred process, the carbinol is formed by dissolving the centrifuge cake from the first step in aniline at 80°–95° C. and adding aqueous 10 to 50 percent caustic, preferably 10 to 30 percent caustic, until the pH reaches about 11.5–12.5. The aqueous layer formed during caustic addition is drawn off, and the organic layer cooled and filtered to give a press cake containing generally 60–70 percent of the carbinol base with the remainder being essentially aniline. The amount of carbinol base in the presscake will, of course, be dependant upon the nature of the dyestuff. The presscake may be washed free of aniline with toluene, xylene, or similar solvents, and dried to give a light colored carbinol. The carbinol product is substanitally pure, i.e. it has a purity generally greater than 90 percent, preferably greater than 95 percent, and most preferably about 98 percent or more.

When the degree of ring-methylation of the triarylmethane dyestuff is three or greater, use of the nitrate salt as a means of separation and purification is impractical, as the salt is too soluble in the filtrate. For Basic Violet 2, for example, the nitrate filter cake contains only about 6 percent by weight of dyestuff salt. Thus, for these more highly methylated pararosanilines, or for other triarylmethane dyestuffs whose nitrate salts have appreciable solubility, other methods of initial, precarbinolization purification may be necessary. Such methods may involve the formation of a salt other than a nitrate; the addition of large quantites of inorganic salt (salting out); or removal of solvent by distillation prior to crystallization of product or formation of the carbinol followed by distillation. These and other methods are well known to those skilled in dye chemistry. At times, the carbinol may be formed directly from the crude reaction mixture without purification prior to its formation.

The carbinol base may be stored, or may be used immediately, for example, by dissolving in an inorganic or organic acid to form the desired salt. Preferably, organic carboxylic acids, for example a resinic acid such as oleic acid is used to form the highly colored resinate salt. To prepare such resinate salts, the carbinol is generally dissolved in a resinic acid at moderately elevated temperature, i.e. from 40°–100° C., preferably from 60°–90° C. The product of the reaction is the highly colored resinate. In the sense used by the inventors, the term resinic acid refers to long chain saturated or unsaturated carboxylic acids. These acids may be derived from a variety of sources, i.e. from rosin, from the processing of cellulose products (tall oil acids), or from the hydrolysis of animal or vegetable triglycerides. Examples of saturated "resinic" acids are lauric, palmitic and stearic acids. Examples of unsaturated resinic acids are linoleic, linolenic, oleic, palmitoleic, abietic, and pimaric acids.

The practice of the invention may be illustrated by the following examples.

EXAMPLE 1

From an alkali blue process stream is isolated 274 g of crude pararosaniline nitrate, formed by adding concentrated aqueous sodium nitrate to the pararosaniline hydrochloride reaction mixture. The pararosaniline nitrate is dissolved in 650 g aniline at 80° C. to which 54 g of 50 percent aqueous sodium hydroxide is slowly added to bring the pH to 11.5 to 12.5. The aqueous layer is allowed to separate, is drawn off, and the organic layer allowed to cool. Crystals of pararosaniline carbinol base are isolated as a filter cake weighing 151 g and assaying 62 percent by weight pararosaniline carbinol. Following toluene wash to remove residual aniline, the dry, slightly pink carbinol base assays at 98 percent purity.

EXAMPLE 2

Oleic acid (82 parts by weight) is heated to 85° C., into which 18 parts of the pararosaniline carbinol of Example 1 is slowly dissolved with stirring. The resulting homogeneous mixture is cooled to give a deep magenta-colored liquid suitable for use in ribbon and ball-point pen ink formulations.

The embodiments of the invention in which an exclusive property or privilege is claimed are defined as follows:

1. A process for the preparation of triarylmethane dyestuff salts, comprising:
   (a) adding alkali nitrate to a triarylmethane hydrochloride having the formula:

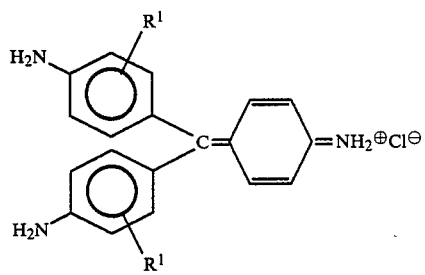

wherein $R^1$ is hydrogen, $C_1$–$C_8$ alkyl or alkenyl, halo, cyano, or alkoxy; and R is hydrogen, lower alkyl, lower alkenyl, phenyl, substituted phenyl, naphthyl; or substituted naphthyl, and where n is an integer from 1 to about 3;
   (b) separating from the mixture prepared in step 1, the nitrate salt corresponding to the triarylmethane dyestuff;
   (c) dissolving said nitrate salt of (b) in aniline;
   (d) adding sufficient aqueous alkali to raise the pH of the mixture (c) to from about 11.5 to about 12.5;
   (e) separating from the reaction mixture (d) a presscake containing the carbinol base form of said triarylmethane dyestuff; and
   (f) reacting said carbinol base form of said triarylmethane dyestuff with sufficent acid to form said triarylmethane dyestuff salt.

2. The process of claim 1 wherein said acid is selected from the group consisting of nitric acid, phosphoric acid, chromic acid, sulfuric acid, molybdic acid, tungstic acid, phosphomolybdotungstic acid, hydrochloric acid, hydrobromic acid, hydroiodic acid, and carboxylic acids.

3. The process of claim 2 wherein said carboxylic acid is selected from the group consisting of carboxylic acids having from about 2 to about 20 carbon atoms.

4. The process of claim 2 wherein said carboxylic acid is selected from the group consisting of acetic acid, oxalic acid, and the resinic acids.

5. The process of claim 4 wherein said resinic acid is oleic acid.

6. The process of claim 1, further comprising washing the carbinol base product of (f) with an organic solvent to remove substantially all of the aniline in the crude carbinol base prior to forming said triarylmethane dyestuff salt.

7. The process of claim 6 wherein said solvent is an aromatic solvent.

8. The process of claim 7 wherein said aromatic solvent is toluene or xylene.

9. The process of claim 1 wherein said triarylmethane dyestuff is a paraosaniline family dyestuff whose salt has the formula:

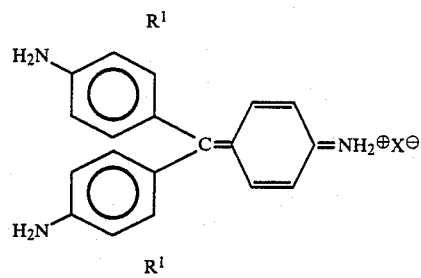

wherein $R^1$ may be hydrogen, $C_1$-$C_8$ alkyl, halo, cyano, or alkoxy, and wherein X is a resinic acid anion.

10. The process of claim 9 wherein said acid anion is an oleate anion.

* * * * *